United States Patent
vonBerge

(10) Patent No.: US 11,254,991 B2
(45) Date of Patent: Feb. 22, 2022

(54) USE OF NON-IONICALLY STABILIZED WATERBORNE ANTISOIL COATINGS FOR AUTOMOTIVE LEATHER

(71) Applicant: LEAR CORPORATION, Southfield, MI (US)

(72) Inventor: Robert vonBerge, Rochester Hills, MI (US)

(73) Assignee: Lear Corporation, Southfield, MI (US)

(*) Notice: Subject to any disclaimer, the term of this patent is extended or adjusted under 35 U.S.C. 154(b) by 148 days.

(21) Appl. No.: 16/506,527

(22) Filed: Jul. 9, 2019

(65) Prior Publication Data

US 2021/0010097 A1    Jan. 14, 2021

(51) Int. Cl.
| | | |
|---|---|---|
| *C14C 11/00* | (2006.01) | |
| *C09D 175/04* | (2006.01) | |
| *C09D 167/02* | (2006.01) | |
| *C09D 133/06* | (2006.01) | |
| *C09D 5/16* | (2006.01) | |

(52) U.S. Cl.
CPC ........ *C14C 11/006* (2013.01); *C09D 133/066* (2013.01); *C09D 167/025* (2013.01); *C09D 175/04* (2013.01); *C14C 11/003* (2013.01); *C09D 5/1637* (2013.01)

(58) Field of Classification Search
CPC .............................. C14C 11/006; C14C 11/003
See application file for complete search history.

(56) References Cited

U.S. PATENT DOCUMENTS

| | | | |
|---|---|---|---|
| 4,668,726 A | 5/1987 | Howells | |
| 8,318,848 B2 | 11/2012 | Finegan et al. | |
| 9,005,712 B2 * | 4/2015 | Uhlianuk | B05D 7/572 |
| | | | 427/385.5 |
| 9,845,516 B2 | 12/2017 | Steele | |
| 2005/0255330 A1 * | 11/2005 | Meyer | C08G 63/672 |
| | | | 428/480 |
| 2012/0028886 A1 | 2/2012 | McDaniel. | |
| 2015/0191607 A1 | 7/2015 | McDaniel | |

FOREIGN PATENT DOCUMENTS

| | | | |
|---|---|---|---|
| CN | 104193941 A | * | 12/2014 |
| JP | 2010241963 A | | 10/2010 |

OTHER PUBLICATIONS

CN-104193941_12-2014_English Translation.*

* cited by examiner

*Primary Examiner* — Michael L Leonard
(74) *Attorney, Agent, or Firm* — Brooks Kushman P.C.

(57) ABSTRACT

A leather finishing composition includes water, a polymeric component, and a non-ionic surfactant component covalently bonded to the polymeric component. Advantageously, the leather finishing composition is substantially free of ionic groups. A method for applying the leather finishing composition to a leather substrate is provided.

7 Claims, No Drawings

_US 11,254,991 B2_

USE OF NON-IONICALLY STABILIZED WATERBORNE ANTISOIL COATINGS FOR AUTOMOTIVE LEATHER

TECHNICAL FIELD

In at least one aspect, the present invention is related to leather finishing composition for treating leather such that the treated leather has improved soiling and fouling resistance.

BACKGROUND

Leather finishing involves the application of polymer containing compositions to improve the appearance and for protection. Some of these polymer-containing compositions are emulsions that include anionic character that helps to stabilize the polymer in water. Although these prior art leather finishing compositions work reasonably well, there tends to be issues with fouling, and in particular staining from denim, transferred by vehicle occupants.

Accordingly, there is a need for a leather finishing composition that results in a leather with improved fouling resistance.

SUMMARY

In at least one aspect, the present invention solves one or more problems of the prior art by providing a leather finishing composition. The leather finishing composition includes water, a polymeric component, and a non-ionic surfactant component. The non-ionic surfactant component is covalently bonded to the polymeric component. Advantageously, the non-ionic surfactant component stabilizes the polymeric component. Characteristically, the leather finishing composition is substantially free of ionic groups.

In another aspect, a method for treating leather with the leather finishing composition is provided. The method includes a step of applying a leather finishing composition to a leather substrate to form a treated substrate. The finishing composition includes a polymeric component and a non-ionic surfactant component where the non-ionic component is covalently attached to the polymeric component. Advantageously, the non-ionic surfactant component stabilizes the polymeric component. Characteristically, the leather finishing composition is substantially free of ionic groups. The treated substrate is allowed to cure or dry to form a finished leather substrate.

DETAILED DESCRIPTION

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; molecular weights provided for any polymers refers to weight average molecular weight unless otherwise indicated; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken an alternative upper or lower limits. For example, if the range is 1.1. to 2.1 the following number 1.2, 1.3, 1.4, 1.5, 1.6, 1.7, 1.8, 1.9, and 2.0 can be selected as lower or upper limits.

Throughout this application, where publications are referenced, the disclosures of these publications in their entireties are hereby incorporated by reference into this application to more fully describe the state of the art to which this invention pertains.

The term "acid number" means the mass of potassium hydroxide (KOH) in milligrams that is required to neutralize one gram of a polymer that has acidity from acid groups.

The term "base polymer" means a polymer to which a function group or non-ionic moiety is attached.

The term "non-ionic surfactant moiety" is formally a radical derived from a non-ionic surfactant (e.g., collectively a functional group). Therefore, the non-ionic surfactant moiety can be bonded to a base polymer. Non-ionic surfactant moieties will have the general structure of the non-surfactants set forth herein, but will have an atom therein replaced with a bond to a base polymer. Alternatively, the non-ionic surfactant moieties will have the general structure of the non-surfactants set forth above, but will have an atom therein replaced with a functional group that is bonded to a base polymer.

In an embodiment, a leather finishing composition is provided. The leather finishing composition includes water, a polymeric component, and a non-ionic surfactant component. Characteristically, the non-ionic surfactant component is bonded to the polymeric component. The polymeric component is a polymer or a mixture of polymer. Examples of suitable polymers include, but are not limited to, polymers or copolymers of polyethers, polycarbonates, polyesters, polyurethanes, silicones, polyacrylates, and combinations thereof. Advantageously, the non-ionic surfactant component stabilizes the polymeric component. Characteristically, the leather finishing composition is substantially free of ionic groups (e.g., electrically charged groups). Examples of such ionic groups can be anionic surfactants or moieties thereof and cationic surfactants or moieties thereof.

Characteristically, the non-ionic component is covalently attached to the polymeric component to form a non-ionically functionalized polymer or a mixture of non-ionically functionalized polymers. In this refinement, the non-ionic component is referred to non-ionic moieties since they are bonded to the base polymers in the polymeric component.

As set forth above, the non-ionic surfactant component stabilizes the polymeric component. In this regard, the non-ionic surfactant component allows a dispersion or emulsion in water to be formed. In other refinements, the non-ionic surfactant component allows at least a portion of the polymeric component to be dissolved in water.

In a variation, the polymer component is present in an amount from about 20 to 80 weight percent of the total weight of the leather finishing composition, the surfactant is present in an amount from about 0.5 to 30 weight percent of the total weight of the leather finishing composition, optional additives as set forth below are present in an amount from about 0 to 10 weight percent of the total weight of the leather finishing composition, and the balance is water. In a refinement, the polymer component is present in an amount from about 20 to 70 weight percent of the total weight of the leather finishing composition, the surfactant is present in an amount from about 0.5 to 5 weight percent of the total weight of the leather finishing composition, optional additives as set forth below are present in an amount from about 0 to 10 weight percent of the total weight of the leather finishing composition, and the balance is water.

Characteristically, the polymeric component has less than 0.03 ionic groups (e.g., anionic surfactant moieties or cationic surfactant moieties) per kilogram of polymeric component. In other refinements, polymeric component has less than, in increasing order of preference, 0.03, 0.02, 0.01, 0.005, 0.003, 0.002, 0.001, 0.0005, or 0.00001 ionic groups per kilogram of polymeric component with a lower limit taken as 0 ionic groups per kilogram of polymeric component. In other refinements (e.g., when the composition includes polyester resins), the polymeric component has an acid number less than, in increasing order of preference, 2, 1, 0.5, 0.1, 0.01, or 0.001 with 0 being taken as a lower limit.

Typically, the non-ionic surfactants or moieties thereof include a hydrophobic head group and a hydrophilic tail or vice versa. Characteristically, these non-ionic surfactants or moieties are not electrically charged. The hydrophobic moiety can be an alkyl, fluoroalkyl, or steroidal. Examples of non-ionic surfactants include, but are not limited to, polyglycerol alkyl ethers, glucosyl dialkyl ethers, crown ethers, ester-linked surfactants, polyoxyethylene alkyl ethers, sorbitan esters, and polysorbates. The non-ionic surfactants can be polyethylene oxide condensates of alkylphenols, polyoxyalkylene derivatives of propylene glycol, condensates of ethylene oxide and the reaction product of propylene oxide and ethylene diamine, ethylene oxide condensates of aliphatic alcohols, long chain tertiary amine oxides, long chain tertiary phosphine oxides, long chain dialkyl sulfoxides and the like. In some variations where the non-ionic component is covalently attached to the polymeric component, the surfactant is a non-ionic surfactant moiety as set forth above.

In a refinement, the non-ionic surfactant component or moiety includes a polyalkylene glycol group, a polyglycerol alkyl ether group, a glucosyl dialkyl ether group, a crown ether group, an ester-linked surfactant group, a polyoxyethylene alkyl ether group, a sorbitan ester group, a polysorbate group, and combinations thereof. In a refinement, the non-ionic surfactant includes a hydroxyl or ethylenically unsaturated groups so that it can be co-polymerized with other monomers to form a non-ionically functionalized polymer or grafted onto a polymer. In a refinement, the hydroxyl or ethylenically unsaturated groups will be terminal groups. Poly(ethylene glycol) methyl ether acrylate is an example of a group with an ethylenically unsaturated group. Polyalkylene glycol monoalkyl ether is an example of a compound with a terminal hydroxyl group. Typically, the polyalkylene glycol monoalkyl ether has a number average molecular weight less than about 1600 (e.g., from 100 to 1550).

In a variation, the non-ionically functionalized polymer is a non-ionically functionalized polyester. The non-ionically functionalized polyester is formed by reacting one or more polycarboxylic acids or anhydrides thereof, a polyol, and a non-ionic surfactant (compound) having at least one free hydroxyl group. Typically, the non-ionic surfactant having at least one free hydroxyl group will be present in an amount from about 1 to 25 weight percent of the combined weight of the one or more polycarboxylic acids or anhydrides thereof, the polyol, and the non-ionic surfactant compound. Examples of polyols include, but are not limited to, ethylene glycol, propylene glycol, 1,4-butylene glycol, diethylene glycol, dipropylene glycol, 1,4-cyclohexane dimethanol, 1,3-propane diol, 1,6-hexanediol, trimethylolpropane, trimethylolethane, neopentyl glycol, and the like. In a refinement, the functionalized polyester resin is a reaction product of: a polyalkylene glycol monoalkyl ether with a number average molecular weight less than 1600, one or more polycarboxylic acids or anhydrides thereof, and one or more polyols such that the polyester resin has an acid number less than 1 (mg KOH/g resin solids). In a further refinement, the functionalized polymer component and the non-ionic surfactant component is a reaction product of: from about 0.5 to 25% by weight of a polyalkylene glycol monoalkyl ether with a number average molecular weight less than 1600; from about 10 to 30% by weight of one or more polycarboxylic acids or their anhydrides; and from about 30 to 80% by weight of one or more polyols; and wherein the polyester resin has an acid number less than 1 (mg KOH/g resin solids).

In another variation, the non-ionically functionalized polymer is a non-ionically functionalized polyurethane. The non-ionically functionalized polyurethane is formed by reacting an isocyanate having 2 or more (e.g. 2, 3, 4, 5) isocyanate groups, one or more polyols, and a non-ionic surfactant (compound) having at least one free hydroxyl group. Typically, the non-ionic surfactant having at least one free hydroxyl group will be present in an amount from about 1 to 25 weight percent of the combined weight of the isocyanate, the polyol, and the non-ionic surfactant compound. In a refinement, the isocyanate is an aliphatic or cycloaliphatic isocyanate. Examples of such aliphatic or cycloaliphatic isocyanate include, but are not limited to, 1,6-hexamethylene diisocyanate, 1-isocyanato-3-isocyanatomethyl-3,5,5-trimethyl-cyclohexane, and 4,4'-diisocyanato dicyclohexylmethane. Polyols can be polyether polyols, polyester polyols, ethylene glycol, propylene glycol, 1,4-butylene glycol, diethylene glycol, dipropylene glycol, 1,4-cyclohexane dimethanol, 1,3-propane diol, 1,6-hexanediol, trimethylolpropane, trimethylolethane, neopentyl glycol, and the like.

In another variation, the non-ionically functionalized polymer is a non-ionically functionalized copolymer formed by polymerizing a monomer having a non-ionic surfactant moiety and with an acrylic monomer not having a non-ionic surfactant moiety. In this variation, the non-ionic surfactant moiety will be ethylenically unsaturation. In a refinement, the ethylenically unsaturation is an acrylate or methacrylate group attached to the non-ionic surfactant moiety. An example of a monomer having a non-ionic surfactant moiety is poly(ethylene glycol) methyl ether acrylate. Examples of acrylate monomers not having an non-ionic surfactant moiety include, but are not limited to, methacrylate, methyl acrylate, ethyl acrylate, 2-ethylhexyl acrylate, hydroxyethyl methacrylate, butyl acrylate, butyl methacrylate, trimethylolpropane triacrylate, 1,1,1,3,3,3-hexafluoroisopropyl acrylate, bis-(2,2,2-trifluoroethyl) itaconate, bis-(1,1,1,3,3,3-hexafluoroisopropyl), 1H, 1H,3H-hexafluorobutyl acrylate, 1H,1H,7H-dodecafluoroheptyl methacrylate, 2,2,2-trifluoroethyl acrylate, 2,2,2-trifluoroethyl methacrylate, aliphatic, fluorinated aliphatic, 1H, 1H,2H,2H-Heptadecafluorodecyl methacrylate 532.2 acrylic, 1H, 1H,2H,2H-heptadecafluorodecyl acrylate, 1H, 1H,5H-octafluoropentyl acrylate, 1H, 1H,3H-tetrafluoropropyl methacrylate, hexafluoro-iso-propyl, 1H, 1H,3H-hexafluorobutyl methacrylate, 1H, 1H,5H-octafluoropentyl methacrylate, and combinations thereof.

In still another variation, the non-ionically functionalized polymer can be formed by grafting a non-ionic surfactant moiety onto a base polymer or copolymer. In one refinement, the graft polymer can be formed by coupling a base polymer having a halide (e.g., CL, Br, I, etc.) on the polymer backbone with a surfactant compound having a non-ionic surfactant moiety and an ethylenically unsaturated group. (e.g., poly(ethylene glycol) methyl ether acrylate). This reaction usually involves a catalyst such as Cu(I)X (where X is Cl, Br, I, or other negatively charged ligand). The base polymer with halide substitution can be formed by UV halogenation of a polymer or by copolymerization with a halogenated monomer and a monomer with halogen. In one refinement, the copolymer can be an acrylate polymer formed from unhalogenated acrylic monomers such as methacrylate, methyl acrylate, ethyl acrylate, 2-ethylhexyl acrylate, hydroxyethyl methacrylate, butyl acrylate, butyl methacrylate, trimethylolpropane triacrylate, and combinations thereof. Examples of halogenated monomer include, but are not limited to, 2-chloroethyl vinyl ether, poly(isopropyl-alpha-bromoacrylate), poly(methyl-alpha-bromoacrylate), poly(n-pentyl-alpha-bromoacrylate), poly(n-propyl-alpha-bromoacrylate), poly(methyl alpha-trifluoromethylacrylate), poly(sec-butyl-alpha-bromoacrylate), poly(cyclohexyl-alpha-bromoacrylate), poly(methyl-alpha-bromomethacrylate), poly(butyl chloroacrylate), poly(sec-butyl chloroacrylate), poly(methyl chloroacrylate), poly(isobutyl chloroacrylate), poly(isopropyl chloroacrylate), poly(cyclohexyl chloroacrylate), poly(2-chloroethyl chloroacrylate), poly[1-methoxycarbonyl-1-methoxycarbonylmethylene) ethylene], poly(methyl chloroacrylate) poly(ethyl alpha-chloroacrylate), poly(methyl beta-chloroacrylate) and combinations thereof.

In some variations, the leather finishing composition can include one or more additives. Examples of such additives include, but are not limited to, rheology modifiers, additional surfactants (e.g., non-ionic), defoamers, organic solvents, dispersants, coalescents, light stabilizers, biocides and combinations thereof. In a variation, the additives are collectively present in an amount from about 0.1 to 10 weight percent of the leather finishing composition. In a refinement, the additives are collectively present in an amount from about 1 to 5 weight percent. It should be appreciated that other well-known additives can be utilized to provide additional properties. In a refinement, each of the following additives are independently optionally present in an amount greater than 0.01, 0.05, 1.0, 2.0, 3.0 or 4.0 weight percent of the total weight of the stain composition and in an amount less than, 15.0, 10.0, 9.0, 8.0, 7.0, or 6.0 weight percent of the total weight of the leather finishing composition.

In another embodiment, a method for treating leather is provided. The method includes a step of applying a leather finishing composition to a leather substrate to form a treated substrate. The finishing composition includes a polymeric component and a non-ionic surfactant component wherein the non-ionic surfactant component is bonded to the polymeric component. Advantageously, the leather finishing composition is substantially free of ionic groups. The treated substrate is allowed to cure or dry to form a finished leather substrate.

The following examples illustrate the various embodiments of the present invention. Those skilled in the art will recognize many variations that are within the spirit of the present invention and scope of the claims.

Composition Example 1

About 50 grams of a polyalkylene glycol monoalkyl ether with a number average molecular weight of about 500 is combined with about 200 g of adipic acid, and 300 g of neopentyl glycol are charged to a four-neck flask having a condenser, water separator, stirrer, and thermometer. The mixture is heated to about 230° C. until the polymerization is completed to form a leather finishing composition. About 300 g of deionized water is then added to the resulting mixture and stirred to form an emulsion. The emulsion is then neutralized with aqueous ammonia to form a leather finishing composition. The leather finishing composition is applied to a leather vehicle seat and allowed to dry.

Composition Example 2

About 50 grams of a polyalkylene glycol monoalkyl ether with a number average molecular weight of about 500 is combined with about 400 g of 1,4-butylene glycol and charged to a four-neck flask having a condenser, water separator, stirrer, and thermometer. The resulting mixture is heated to about 90° C. and stirred for about 30 minutes. About 300 g of 1,6-hexamethylene diisocyanate is added dropwise to the flask over a time period of 1 hour. The mixture is then allowed to react at 90° C. for an additional 2 hours. About 300 g of deionized water is then added to the resulting mixture and stirred to form an emulsion. The emulsion is then neutralized with aqueous ammonia to form a leather finishing composition. The leather finishing composition is applied to a leather vehicle seat and allowed to dry.

Composition Example 3

An acrylic polymer is formed from about 30 g isooctyl acrylate, 10 g methyl methacrylate, 1 g methacrylic acid, 1 g hydroxyethyl acrylate, 1 g divinylbenzene, 1 g acetoacetoxyethyl methacrylate, 1 g sodium dodecyl benzene sulfonate, 3 g polyoxyethylene lauryl ether, 1 g sodium persulfate, and 50 g water. A pre-emulsion is formed from isooctyl acrylate, methyl methacrylate, methacrylic acid, hydroxyethyl acrylate, divinyl benzene, acetoacetoxyethyl methacrylate and of deionized water and sodium dodecylbenzenesulfonate were emulsified with a homogenizer for 15 minutes to obtain a pre-emulsion. Additional deionized water, sodium dodecylbenzenesulfonate and about a tenth of the pre-emulsion are introduced into the reaction vessel and heated to 90° C. The sodium persulfate is then added and allowed to react for about 1 hour. The remaining pre-emulsion is then added dropwise over about 4 hours. The mixture is a maintained at about 90° C. for an additional 3 hours. The mixture is cooled to about 60° C. The lauryl alcohol polyoxyethylene ether is then added and stirring continued for 30 minutes. The resulting composition is then cooled to room temperature and neutralized with aqueous ammonia to form the leather finishing composition. The leather finishing composition is applied to a leather vehicle seat and allowed to dry.

Fouling Example 1

Blue jean denim dye (Indigo) interacts with anionic amine-neutralized waterborne polymers, in the same manner as laundry soap does. This "polymer soap" allows the indigo dye to be extracted from the denim into the coating. This happens with wet or dry denim; just as wet or dry soap would behave. A solution of oleic acid and triethanolamine (TEOA) is combined stoichiometrically to create a 4% TEOA-oleate soap in water. Ground denim is added which turns blue. Water or alcohol alone is unable to extract the blue dye. Anionic dish soap is compared to nonionic Triton X-100. No blue transfer occurs in the non-ionic surfactant; however, the anionic composition has a 0.178 absorption coefficient at 420 nm light vs the non-ionic surfactant composition.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A leather finishing composition comprising:
   a polymeric component;
   a non-ionic surfactant component that stabilizes the polymeric component, the non-ionic surfactant component being covalently bonded to the polymeric component; and
   water wherein the leather finishing composition is substantially free of ionic groups. groups, wherein a combination of the polymeric component and the non-ionic surfactant component is a polyester resin that is a reaction product of:
   (a) a polyalkylene glycol monoalkyl ether with a number average molecular weight less than 1600;
   (b) one or more polycarboxylic acids or their anhydrides; and
   (c) one or more polyols; and wherein said polyester resin has an acid number less than 1 (mg KOH/g resin solids).

2. The leather finishing composition of claim 1, wherein the ionic groups are present in an amount that is less than 0.03 ionic groups per kilogram of polymeric component.

3. The leather finishing composition of claim 1, wherein the ionic groups are present in an amount that is less than 0.005 ionic groups per kilogram of polymeric component.

4. The leather finishing composition of claim 1 wherein the polymeric component includes a polymer selected from the group consisting of polyethers, polycarbonates, polyesters, polyurethanes, silicones, and polyacrylates.

5. The leather finishing composition of claim 1, wherein the non-ionic surfactant component includes a polyalkylene glycol group, a polyglycerol alkyl ether group, a glucosyl dialkyl ether group, a crown ether group, an ester-linked surfactant group, a polyoxyethylene alkyl ether group, a sorbitan ester group, a polysorbate group, and combinations thereof.

6. The leather finishing composition of claim 1 wherein a combination of the polymer polymeric component and the non-ionic surfactant component is a polyester resin that is a reaction product of:
   (a) from about 1 to 25% by weight of a polyalkylene the polyalkylene glycol monoalkyl ether with a number average molecular weight less than 1600;
   (b) from about 10 to 30% by weight of one or more the one or more polycarboxylic acids or their anhydrides; and
   (c) from about 30 to 80% by weight of one or more polyols; and wherein the polyester resin has an acid number less than 1 (mg KOH/g resin solids).

7. The leather finishing composition of claim 1, wherein the non-ionic surfactant component is grafted onto the polymeric component.

* * * * *